(12) United States Patent
Bose

(10) Patent No.: US 6,605,556 B1
(45) Date of Patent: *Aug. 12, 2003

(54) HIGH TEMPERATURE COMPOSITE MATERIAL FORMED FROM NANOSTRUCTURED POWDERS

(75) Inventor: Sudhangshu Bose, Manchester, CT (US)

(73) Assignee: United Technologies Corporation, Hartford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 513 days.

(21) Appl. No.: 08/476,497

(22) Filed: Jun. 7, 1995

Related U.S. Application Data

(62) Division of application No. 08/261,600, filed on Jun. 17, 1994, now abandoned.

(51) Int. Cl.[7] .................. C04B 35/80; C04B 35/81
(52) U.S. Cl. ............... 501/95.2; 501/95.3; 501/88; 501/89
(58) Field of Search ................ 501/89, 95, 88, 501/95.2, 95.3

(56) References Cited

U.S. PATENT DOCUMENTS

| | | | | |
|---|---|---|---|---|
| 4,507,224 A | * | 3/1985 | Toibana et al. .......... | 501/89 X |
| 4,543,345 A | * | 9/1985 | Wei ..................... | 501/95 |
| 4,652,413 A | * | 3/1987 | Tiegs .................. | 264/66 |
| 4,839,316 A | * | 6/1989 | Tiegs .................. | 501/89 |
| 4,961,757 A | * | 10/1990 | Rhodes et al. .......... | 501/89 X |
| 4,992,395 A | | 2/1991 | Dulberg et al. | |
| 5,132,155 A | * | 7/1992 | Singh et al. ........... | 501/95 X |
| 5,147,446 A | * | 9/1992 | Pechenik et al. ........ | 75/230 |
| 5,187,127 A | * | 2/1993 | Goto et al. ............ | 501/95 |
| 5,230,951 A | * | 7/1993 | Birchall et al. ........ | 501/95 X |
| 5,312,787 A | * | 5/1994 | Uchida et al. .......... | 501/95.1 |
| 5,376,599 A | * | 12/1994 | Oshima et al. .......... | 501/97 X |
| 5,422,319 A | * | 6/1995 | Stempin et al. ......... | 501/95 X |
| 5,455,106 A | * | 10/1995 | Steffier ............... | 501/95 X |
| 5,456,981 A | * | 10/1995 | Olry et al. ............ | 501/95 X |

FOREIGN PATENT DOCUMENTS

| | | |
|---|---|---|
| EP | 249927 | 12/1987 |
| GB | 225929 | 3/1993 |

* cited by examiner

*Primary Examiner*—Karl Group
(74) *Attorney, Agent, or Firm*—Bachman & LaPointe, P.C

(57) ABSTRACT

The present invention relates to high temperature composite materials formed from nano-sized powders suitable for use in the manufacture of jet engine components. The composite materials consist essentially of a matrix formed from a powdered material having a particle size in the range of from about 1 to about 100 nanometers and a plurality of reinforcing fibers embedded within the matrix and comprising from about 20% to about 40% by volume of the composite material. The method of manufacturing the composite materials broadly comprises the steps of mixing the powdered material with the reinforcing fibers and consolidating the mixture to form the composite material.

13 Claims, No Drawings

HIGH TEMPERATURE COMPOSITE MATERIAL FORMED FROM NANOSTRUCTURED POWDERS

This is a Division, of application Ser. No. 08/261,600, filed Jun. 17, 1994, now abandoned.

BACKGROUND ART

The present invention relates to a high temperature composite material having particular utility in jet engine applications and a method for forming said composite material.

Gas turbine engine performance will increasingly depend on the temperature capabilities of newer and novel structural materials. In the turbine section of the engine, these materials will likely have to sustain gas path temperatures in excess of 2100° C. A significant number of components in the turbine section, as well as in other engine sections, will typically be formed from fiber reinforced composite materials. In the future, successful composite materials will have to be substantially pore free, and processed under less aggressive thermal environment in order to avoid damage to the reinforcing fibers which will typically be incorporated into these composite materials.

Currently, composite materials under evaluation for engine components are ceramic, intermetallic, and metal matrix composites reinforced with continuous fibers. Typically, they are fabricated using methods that call for powder metallurgical processing techniques such as cold pressing followed by sintering and hot pressing. Three of the problems encountered during such processing are:

1. At the consolidation temperatures which are typically high, there is significant thermal damage to the fiber due to high temperature exposure. As a consequence, the residual strength of the fiber decreases considerably;
2. The reactivity between the fiber and the matrix increases due to high processing temperature. This results in chemical degradation of fiber and in the formation of strong bonds; and
3. The space enclosed between neighboring fibers does not get as fully penetrated by the matrix powder as the rest of the sample. As a consequence, the interfiber space exhibits more porosity than elsewhere. The shape and the size of the powder particles play an important role in this problem.

The emerging technology of nanocrystalline materials provides a potentially attractive and viable solution to these problems. Nanocrystalline materials are polycrystals with crystallite sizes typically between 1 and 100 nanometers. When consolidated, these materials exhibit a structure in which as high as 50% of the solid consists of incoherent interfaces between crystals which are differently oriented. Since grain boundaries occupy such a large volume fraction of the structure, nanocrystalline materials exhibit some properties which are radically different from those of their crystalline counterpart. These properties include diffusivity, plastic deformation and alloying capability. The diffusivity in materials in nanocrystalline form is several orders of magnitude faster than in the corresponding crystalline counterpart. A very attractive feature of nanocrystalline materials is the capability to introduce alloying in systems which ordinarily do not exhibit any mutual solid solubility.

A variety of different techniques for manufacturing nanocrystalline structures and for forming components therefrom are known in the art. U.S. Pat. No. 4,909,840 to Schlump, for example, illustrates a process of manufacturing nanocrystalline powders and molded bodies from the powders. The Schlump process of manufacture involves providing a number of components in powdered from and mixing the components in elementary form or as pre-alloys. The components have particle sizes ranging from 2 to 250 microns. The power components are then subjected to high mechanical forces in order to produce secondary powders having a nanocrystalline structure. The secondary powders are then processed into molded bodies according to known compression molding processes, but at a temperature below the recrystallization temperature.

U.S. Pat. No. 5,147,446 to Pechenik et al. illustrates a method for fabricating dense compacts from nano-sized particles using high pressures and cryogenic temperatures. The Pechenik et al. method comprises pre-compacting or agglomerating at starting powder having a particle size of from 1.0 to 50 nanometers into particles of 50 to 100 microns in size and a density of from 20% to 40% of true density; placing the pre-compacted powder into a pressure cell; lowering the temperature of the cell below room temperature; and applying pressure from 0.1 to 5 GPa to the cell while maintaining the cell at the lowered temperature, thereby forming the compact.

U.S. Pat. No. 5,123,935 to Kanamaru et al. relates to the manufacture of $Al_2O_3$ composites used for machining tools for difficult-cutting steels. The strength and toughness of the $Al_2O_3$ composites are increased by dispersing a titanium compound with an average grain size of not greater than 0.1 microns into $Al_2O_3$ particles with an average grain size of not greater than 1 micron. SiC whiskers are uniformly dispersed between each of the $Al_2O_3$ particles to form a nano composite structure. For this purpose, the SiC whiskers containing 0.3% to 1.5% by weight of oxygen, dissolved uniformly in a solvent, are mixed with a starting $Al_2O_3$ series powder containing Ti compounds to form a uniform mixture, which is then molded and sintered.

As yet, no one has addressed the problems of forming composite materials for jet engine components which will encounter gas path temperatures with improved fiber strength retention after processing conditions in excess of 2100° C. as well as the problem of filling the voids which exist between reinforcing fibers used to provide such composite materials with strength and toughness.

DISCLOSURE OF THE INVENTION

Accordingly, it is an object of the present invention to provide composite materials having utility in high temperature environments.

It is a further object of the present invention to provide composite materials as above formed from nano-sized powders.

It is still a further object of the present invention to provide an improved method for forming such composite materials which allows the composite materials to be densified at temperatures significantly lower than what is called for by conventional crystalline counterparts and thereby avoid thermal and chemical damage to reinforcing fibers embedded therein.

Still other objects and advantages of the present invention are set out and will become clear from the following description.

The foregoing objects are attained by the composite materials and the method of the present invention.

Composite materials in accordance with the present invention comprise a matrix formed from a powdered material having a particle size in the range of from about 1 to 100 nanometers, preferably from about 4 to about 5 nanometers, and a plurality of reinforcing fibers embedded within the matrix. The reinforcing fibers comprise from about 20% to 40% by volume of the composite material. The composite materials of the present invention are further characterized by the substantial absence of voids between adjacent ones of the fibers.

The matrix may be formed from materials selected from the group consisting of refractory oxides with ionic bonds, non-oxides such as nitrides and carbides with covalent bonds intermetallic compounds, metals and alloys. The reinforcing fibers are selected from the group consisting of single crystal fibers, polycrystalline single fibers, multi-filament tows of $Al_2O_3$ fibers, silicon carbide fibers, and silicon nitride fibers having a diameter less than or equal to about 10 microns and a length equal to or greater than about 5 microns.

The composite materials of the present invention may be manufactured by mixing the powdered nano-sized material and the fibers and consolidating the mixture of powdered ceramic materials and fibers. Consolidation can be performed using a hot pressing technique or, alternatively, a cold pressing technique and sintering at elevated temperature. If the latter approach is used, a hot isostatic pressing step can be performed after sintering at atmospheric temperature for final consolidation.

Other details of the composite materials of the present invention and the method of manufacturing them are set out in the following detailed description.

DETAILED DESCRIPTION OF THE PREFERRED EMBODIMENT(S)

As previously discussed, the present invention relates to high temperature composite materials having utility in the manufacture of jet engine components.

The composite materials of the present invention are characterized by a matrix formed from nano-sized powdered materials and a plurality of reinforcing fibers embedded within the matrix material. While there is a wide variety of materials which could be used for the matrix of the present invention, it is preferred to use refractory oxides with ionic bonds such as $Al_2O_3$ and $ZrO_2$, which may be fully or partially stabilized, carbides and nitrides with covalent bonds such as silicon carbide and silicon nitride, and intermetallics such as molybdenum disilicides. The nano-sized powdered material used for the matrix may be formed using any suitable technique known in the art. The matrix material particles however should have a size i the range of from about 1 to about 100 nanometers, preferably from about 4 to about 5 nanometers.

The composite materials of the present invention are further characterized by the presence of reinforcing fibers to improve the strength, creep resistance and toughness of the composite material. The fibers are typically present in a concentration of about 20% to about 40% by volume. It has been found that fewer fibers results in an insufficient amount of support and that too many fibers cause unwanted contact between fibers in the final composite material.

Preferably, the reinforcement fibers will be continuous and thermodynamically stable in the chosen matrix. The fibers should also have a thermal expansion coefficient not significantly different from that of the matrix material. Other important properties for the selection of reinforcing fibers are strength, modulus, diameter and length. Preferably, the fibers have a diameter equal to or less than about 10 microns and a length greater than or equal to about 5 microns. Fibers are distinguishable from whisker type materials by virtue of their aspect ratios. Whiskers have aspect ratios of several tens to several hundreds; whereas fibers have much larger aspect ratios.

Suitable fibers for incorporation into the composite materials of the present invention include single crystal and polycrystalline single filament as well as multi-filament tows of $Al_2O_3$, SiC fibers such as NICALON, both as weave and CVD monofilament, and silicon nitride fibers. For example, single crystal alumina (sapphire) fibers may be used in the composite materials of the present invention.

While it is preferred to use continuous fibers in the composite materials of the present invention, it is also possible to use chopped fibers so long as they meet the foregoing diameter and length requirements. Fibers below 5 microns in length and a micron or less in diameter are considered to be hazardous to health and therefore, should be used with caution.

Fabrication of the composites of the present invention involves several steps. First, if the reinforcing fibers are to be continuous fibers and to be oriented in a particular direction, then the fibers must be wound on a drum for unidirectional orientation or weaved for more complicated two dimensional arrangements. Thereafter, the matrix material is delivered to the fiber. This can be done by either mechanical transport of the matrix material or by using a liquid transport vehicle such as alcohol, water or some other suitable dispersing agent and subsequently eliminating the liquid transport vehicle. When a liquid transport agent is used, the resulting slurry may have any desired viscosity. Once the matrix is applied, the materials need to be dried. The final step of the method comprises consolidating the mixture of the powdered matrix material and the reinforcing fibers. This can be done by elevated temperature sintering in vacuum or inert environments, hot pressing to form a compact, or a combination of pressing to form a compact, sintering and/or hot isostatic pressing. The consolidating step may be carried out using any suitable pressure and residence time at temperature. The temperatures which can be used are matrix material dependent and are discussed hereinafter. The following example of provided to illustrate the manner in which a composite material in accordance with the present invention may be fabricated.

EXAMPLE 1

Nanocrystalline zirconia was prepared by a gas phase condensation method. The weakly agglomerated powder which was thus produced had an average particle size of 4 nanometers. The crystalline phase composition consisted of tetragonal high pressure and monoclinic phases. For comparative assessment, a composite of conventional polycrystalline zirconia was made with powders having an average particle size of about 37 microns.

Uniformly spaced sapphire fibers having a diameter of approximately 120 microns were laid down unidirectionally in the form of tapes. The powdered zirconia matrix material was conveyed mechanically onto the tape. Multiple layers were built in this way and transferred for consolidation to the cavity of a graphite die. Consolidation was accomplished by hot pressing in an argon environment.

The composite with nanocrystalline zirconia as the matrix was hot pressed at 1040° C. and a pressure of 16 ksi. The corresponding composite with the conventional polycrystalline zirconia was hot pressed at 1400° C. and a pressure of 16 ksi. The hold time at temperature was 30 minutes in each case.

The hot pressed composite samples were machined with diamond cutting wheels and metallurgical mounts made and polished for microstructural characterization. For the conventional polycrystalline zirconia, the consolidation was poor with very high porosity, appearing as high as 50%. This is in spite of the fact that sintering had occurred as evidenced by the formation of grain boundaries between contacting grains. The nanocrystalline based composite on the other hand showed full consolidation with no residual porosity.

Still further, there were indications of fiber damage in the conventional polycrystalline zirconia samples as indicated by the absence of a smooth surface on the fiber. Such fiber damage was absent from the nanocrystalline based composite samples.

One of the major concerns in processing high temperature composites is the reactivity and the consequent chemical damage to the fiber. Examination of the interface between the fiber and the matrix in the polycrystalline sample shows that a chemical reaction has occurred and the product formed unevenly at the interface. The fiber has lost its smooth peripheral surface. Due to the presence of yttria in partially stabilizing the zirconia matrix, this reaction product is likely to be yttrium aluminum garnet. The nanocrystalline zirconia based composite did not show any reaction and the fiber surface smoothness has been retained.

These observations indicate that due to a significant lowering in consolidation temperature, composites made with nanocrystalline matrices would reduces thermally and chemically induced fiber degradation and the fiber matrix interface would be relatively weakly bonded.

This example demonstrates the significant advantages of the present invention. Due to their size and shape, nanophase powders will easily penetrate into the interfiber space. As a result, on consolidation, these areas will be equally dense with the rest of the sample. Furthermore, the nanophase powders can be consolidated at temperatures much lower, at least 200° C. to 300° C. lower, than those used for conventional powders. For example, wherein nano-sized refractory oxides are used, consolidation can be carried out at temperatures in the range of from about 700° C. to about 1100° C. Polycrystalline refractory oxide materials are typically consolidated at temperatures in the range of from about 1400° C. to about 1900° C. For nano-sized carbide materials, consolidation can be carried out at 1200° C. to about 1500° C., whereas polycrystalline carbide materials are consolidated at temperatures in the range of from about 1800° C. to about 2000° C. This happens because the large portion of the grain boundary in nanostructured materials plays a very important role in mass transport and the deformation of the material at lower pressure and temperature.

The reduction or elimination of thermal degradation of the fibers, better matrix consolidation and distribution with minimal porosity and reduced/eliminated reactivity of the fibers with the matrix are primary features of the nanocrystalline matrix based composites.

While the present invention has been described with a matrix material formed by a single component, it should be recognized that the matrix material could be a mixture of nano-sized powdered materials. A mixture could be used where it is desired to perform alloying during the consolidation process.

While the composite materials of the present invention are formed using uncoated reinforcement fibers, it is also possible to form them with coated fibers. For example, the reinforcement fibers may have a coating of boron nitride to prevent reaction between the fibers and the matrix material. The coating may be formed in situ or may be externally applied. Still further, more than one coating may be applied to the fibers.

It is apparent that there has been provided in accordance with the present invention a high temperature composite material formed from nanostructured powders which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and road scope of the appended claims.

Although this invention has been shown and described with respect to detailed embodiments thereof, it will be understood by those skilled in the art that various changes, omissions, and additions in form and detail thereof may be made without departing from the spirit and scope of the claimed invention.

What is claimed is:

1. A high temperature capability composite material consisting essentially of:
    a matrix formed from a powder material having a particle size in the range from about 1 to 100 nanometers;
    a plurality of reinforcing fibers embedded within said matrix, said reinforcing fibers comprising from about 20% to about 40% volume of said composite material; and
    said composite material being characterized by the substantial absence of voids between adjacent ones of said fibers.

2. The composite material of claim 1 wherein said matrix is formed from a powdered ceramic material selected from the group consisting of refractory oxides with ionic bonds and nitrides and carbides with covalent bonds.

3. The composite material of claim 2 wherein said powdered ceramic material has a particle size in the range of from about 4 to about 5 nanometers.

4. The composite material of claim 1 wherein said reinforcing fibers are single crystal fibers.

5. The composite material of claim 1 further comprising said fibers being oriented in an uniaxial direction.

6. The composite material of claim 1 wherein said fibers have a diameter less than or equal to about 10 microns.

7. The composite material of claim 1 wherein said fibers have a length equal to or greater than 5 microns.

8. The composite material of claim 1 wherein said reinforcing fibers are polycrystalline single fibers.

9. The composite material of claim 1 wherein said reinforcing fibers are multi-filament tows of $Al_2O_3$ fibers.

10. The composite material of claim 1 wherein said reinforcing fibers are silicon carbide fibers.

11. The composite material of claim 1 wherein said reinforcing fibers are silicon nitride fibers.

12. A high temperature capability composite material for use in jet engine applications, said composite material consisting essentially of:
    a matrix formed from a powdered ceramic material having a particle size in the range of about 1 to 100 nanometers, said powdered ceramic material being selected from the group consisting of refractory oxides with ionic bonds and nitrides and carbides with covalent bonds;
    a plurality of reinforcing fibers embedded within said matrix, said reinforcing fibers comprising from about 20% to about 40% volume of said composite material;
    said reinforcing fibers having a diameter less than of equal to about 10 microns and a length equal to or greater than 5 microns; and said reinforcing fibers being oriented in a uniaxial direction.

13. A high temperature capability composite material consisting of a matrix formed from a powered nano-sized ceramic material having particle sizes solely in the range of about 1 to 100 nanometers, and a plurality of reinforcing fibers embedded within said matrix, said reinforcing fibers comprising from about 20% to about 40% volume of said composite material, and said nano-sized ceramic material penetrating into internal spaces between said reinforcing fibers.

* * * * *